(12) United States Patent
White

(10) Patent No.: US 9,771,151 B2
(45) Date of Patent: Sep. 26, 2017

(54) REACTION DRIVE HELICOPTER WITH CIRCULATION CONTROL

(71) Applicant: David J. White, La Mesa, CA (US)

(72) Inventor: David J. White, La Mesa, CA (US)

(73) Assignee: RJ HELICOPTER CORPORATION, Scottsdale, AZ (US)

( * ) Notice: Subject to any disclaimer, the term of this patent is extended or adjusted under 35 U.S.C. 154(b) by 260 days.

(21) Appl. No.: 14/743,359

(22) Filed: Jun. 18, 2015

(65) Prior Publication Data

US 2015/0367934 A1  Dec. 24, 2015

Related U.S. Application Data

(60) Provisional application No. 62/015,254, filed on Jun. 20, 2014.

(51) Int. Cl.
*B64C 27/18* (2006.01)

(52) U.S. Cl.
CPC .................................. *B64C 27/18* (2013.01)

(58) Field of Classification Search
CPC ............................ B64C 27/18; B64C 27/325
See application file for complete search history.

(56) References Cited

U.S. PATENT DOCUMENTS

| 4,131,390 | A | * | 12/1978 | Schmidt | B64C 27/325 244/207 |
| 9,004,394 | B2 | * | 4/2015 | van der Westhuizen | B64C 27/72 244/17.11 |
| 9,145,831 | B1 | * | 9/2015 | White | F02C 7/08 |
| 2013/0161444 | A1 | * | 6/2013 | Spanos | B64C 27/18 244/17.11 |

* cited by examiner

*Primary Examiner* — Brian M O'Hara
*Assistant Examiner* — Michael Kreiner
(74) *Attorney, Agent, or Firm* — Parsons & Goltry; Robert A. Parsons; Michael W. Goltry

(57) ABSTRACT

A rotor blade for a reaction drive type helicopter is provided. The rotor blade includes a main duct extending from a proximal end, couplable to and for fluid communication with a rotor hub, to a distal end for ducting a first air/gas stream from the rotor hub to the distal end. A nozzle is attached to an outlet of the main duct at the distal end for receiving the first air/gas stream from the main duct and releasing the first air/gas stream to propel the rotor blade. A circulation control is carried at a trailing edge of the blade. A trailing edge duct is carried intermediate the trailing edge and the main duct and is in fluid communication with the main duct by a partition with a plurality of orifices formed therein to bleed air from the main duct and generate a second air/gas stream therein with a pressure less than the pressure of the first air/gas stream. The trailing edge duct supplies the second air/gas stream to the circulation control.

12 Claims, 4 Drawing Sheets

REACTION DRIVE HELICOPTER WITH CIRCULATION CONTROL

CROSS-REFERENCE TO RELATED APPLICATION

This application claims the benefit of U.S. Provisional Application No. 62/015,254, filed 20 Jun. 2014.

FIELD OF THE INVENTION

This invention relates to the field of aviation.

More particularly, the present invention relates to propulsion systems for helicopters.

BACKGROUND OF THE INVENTION

A reaction drive, also known as a pressure-jet and a tip-jet system, have been used successfully in the past to provide rotor power for helicopters. Reaction drive helicopters differ from conventional helicopters in that the rotor power is provided by the thrust of jets mounted at the blade-tips. This eliminates the mechanical transmission systems of conventional helicopters leading to a much lighter aircraft, requiring less energy to move. Reaction drive helicopters have a number of variants which, for the purposes of this invention, are considered to be divided into a first type in which air or gasses are directed through the blades and out a nozzle at the blade tip, and a second type in which a motor is positioned at the blade tip. The first type is typically differentiated on the basis of the air or gas temperature exiting through the jet nozzle at the tips of the helicopter blades. Usually these are labeled hot, warm or cold cycle tip-jet systems and are generated remotely from the blade tip. It is recognized that reaction drive helicopters are part of a larger group of related propulsion units that are generally termed reactive jet drive rotor systems. This larger group encompasses other helicopter rotor tip driven systems including the second type, in which motors such as turbojets, rockets, ramjets, pulse jets and other combustion engines attached to the blade tips have been used to provide rotor power for lifting and forward flight purposes. This invention is concerned with the first type of reaction drive helicopter.

In the field of aeronautics, circulation control is an approach used to modify an airfoil's aerodynamic forces using a specially shaped trailing edge instead of moving surfaces such as flaps. The main purpose of circulation control is to increase the lifting force of the airfoil at times when large lifting forces at low speeds are required, such as takeoff and landing. Circulation control airfoils take advantage of the Coanda effect which increases lift through the interaction of an air jet flowing through a slot in the trailing edge of the airfoil and a free air stream moving over the airfoil's upper surface as the airfoil moves through the air. A jet of air flows out of the slot and follows the curvature of a highly curved lower surface of the airfoil. The jet of air from the slot entrains the free air stream moving over the airfoil to create a laminar flow around the curvature, creating lift.

While circulation control systems work well on conventional airfoils, the use on a reaction drive helicopter is problematic. The air flow supplied to the rotor blades is employed for powering the rotors by being released through nozzles at the blade tips. Another problem using circulation control on rotor blades is flow separation. The flow over the Coanda surface typically separates at an angle between 120-125° from the slot. This separation can become periodic in nature with the separation point alternating between the two angles. This separation "flipping" can cause vibration and periodic lift forces.

It would be highly advantageous, therefore, to remedy the foregoing and other deficiencies inherent in the prior art.

An object of this invention is to use circulation control on a reaction drive helicopter.

Another object is to minimize the unsteady lift phenomenon that occurs due to separation over the Coanda surface.

SUMMARY OF THE INVENTION

Briefly, to achieve the desired objects and advantages of the instant invention, provided is a rotor blade for a reaction drive type helicopter. The rotor blade includes a proximal end couplable to a rotor hub, a distal end terminating in a blade tip, and a trailing edge extending from the proximal end to the distal end. A main duct extends from the proximal end, for fluid communication with the rotor hub, to the distal end. The main duct is for ducting a first air/gas stream from the rotor hub to the blade tip. A nozzle is attached to an outlet of the main duct at the blade tip for receiving the first air/gas stream from the main duct and releasing the first air/gas stream to propel the rotor blade. A circulation control is carried at the trailing edge. A trailing edge duct is carried intermediate the trailing edge and the main duct and separated therefrom by a partition. A plurality of orifices are formed in the partition to bleed air from the main duct and generate a second air/gas stream therein with a pressure less than the pressure of the first air/gas stream. The trailing edge duct supplies the second air/gas stream to the circulation control.

In a specific aspect, the circulation control includes an upper surface of the blade terminating in a lip edge at the trailing edge. A lower surface terminates in a Coanda surface at the trailing edge. A slot is defined between the Coanda surface and the lip edge at the trailing edge in fluid communication with the trailing edge duct for receiving the second air/gas stream from the trailing edge duct and releasing the second air/gas stream to produce a Coanda effect.

BRIEF DESCRIPTION OF THE DRAWINGS

The foregoing and other and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
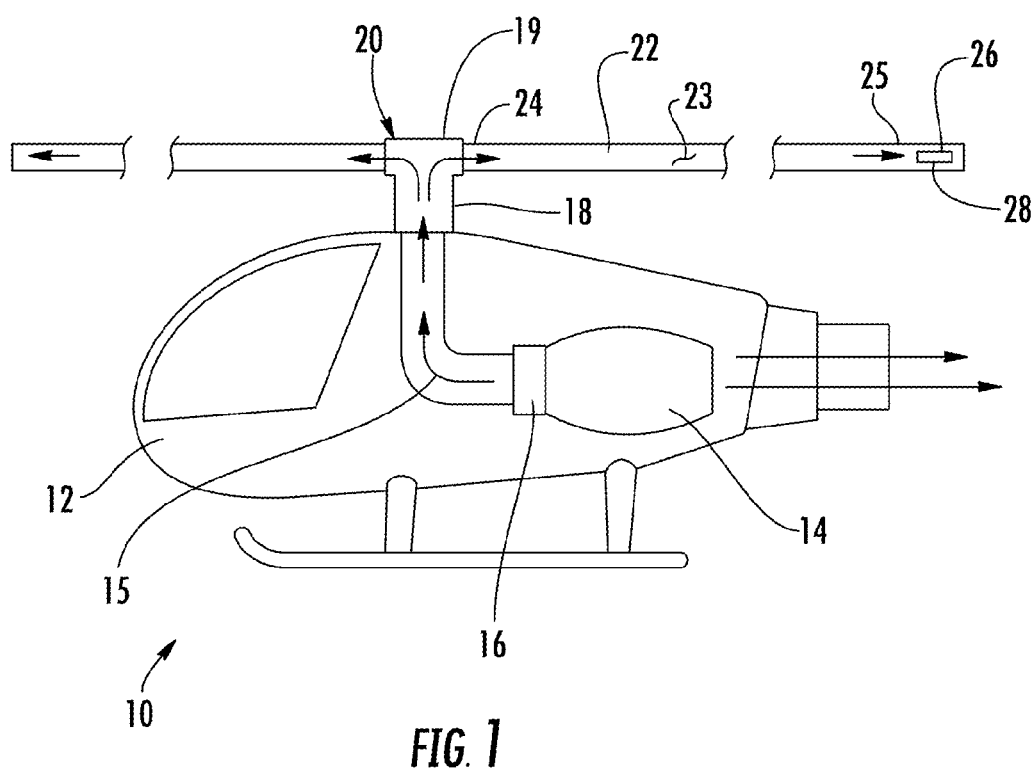
FIG. 1 is a representation of a reaction drive helicopter incorporating circulation control according to the present invention.

Turning now to the drawings in which like reference characters indicate corresponding elements throughout the several views, attention is first directed to FIG. 1 which illustrates a reaction drive helicopter, generally designated 10. Helicopter 10 includes a fuselage or body 12 carrying an engine 14 producing a stream of compressed air and/or gas 15. The air or gas flow path for reaction drive helicopters originates at either a driven load compressor 16 or a bleed from a gas turbine engine (not specifically shown). The air is ducted from engine 14 and/or compressor 16 to a hollow rotor mast 18 where it flows vertically upward to a hub 19 of a rotor 20. Hub 19 has air channels that divide and transmit the air/gas to rotor blades 22 coupled to hub 19. Each blade 22 includes a proximal end 24 coupled to hub 19 and a distal end 25 terminating in a blade tip 26. Blades 22 are hollow and define a main duct 23 extending from proximal end 24 to distal end 25 and are in communication with hollow rotor mast 18 through hub 19. The air/gas flow from mast 18 is turned through 90-degrees and split by hub 19. The air/gas is redirected and split between blades 22 where it is ducted through main duct 23 to blade tips 26 and discharged, through nozzles 28. The discharged air/gas induces rotational movement of blades 22. Specific details of the reaction drive helicopter 10 and details of the production of the air/gases ducted to the blade tips have not been provided, since the blade tips, according to the present invention, will function with substantially any reaction drive helicopter discharging air/gas through the blades. How the air/gas is generated can be accomplished in a variety of methods.

Figure 2:
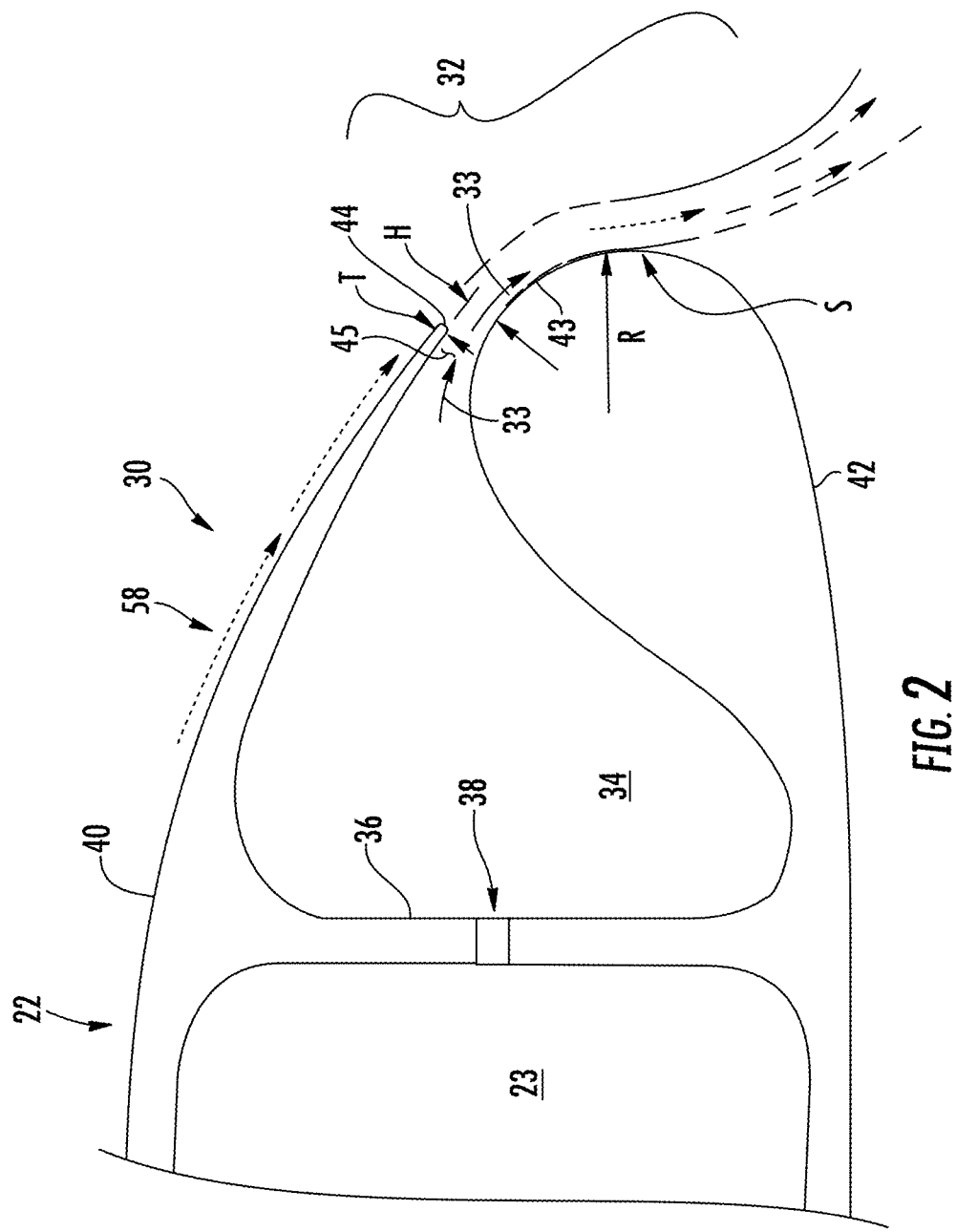
FIG. 2 is a cross-sectional partial view of a rotor blade according to an embodiment of the present invention.
Figure 3:
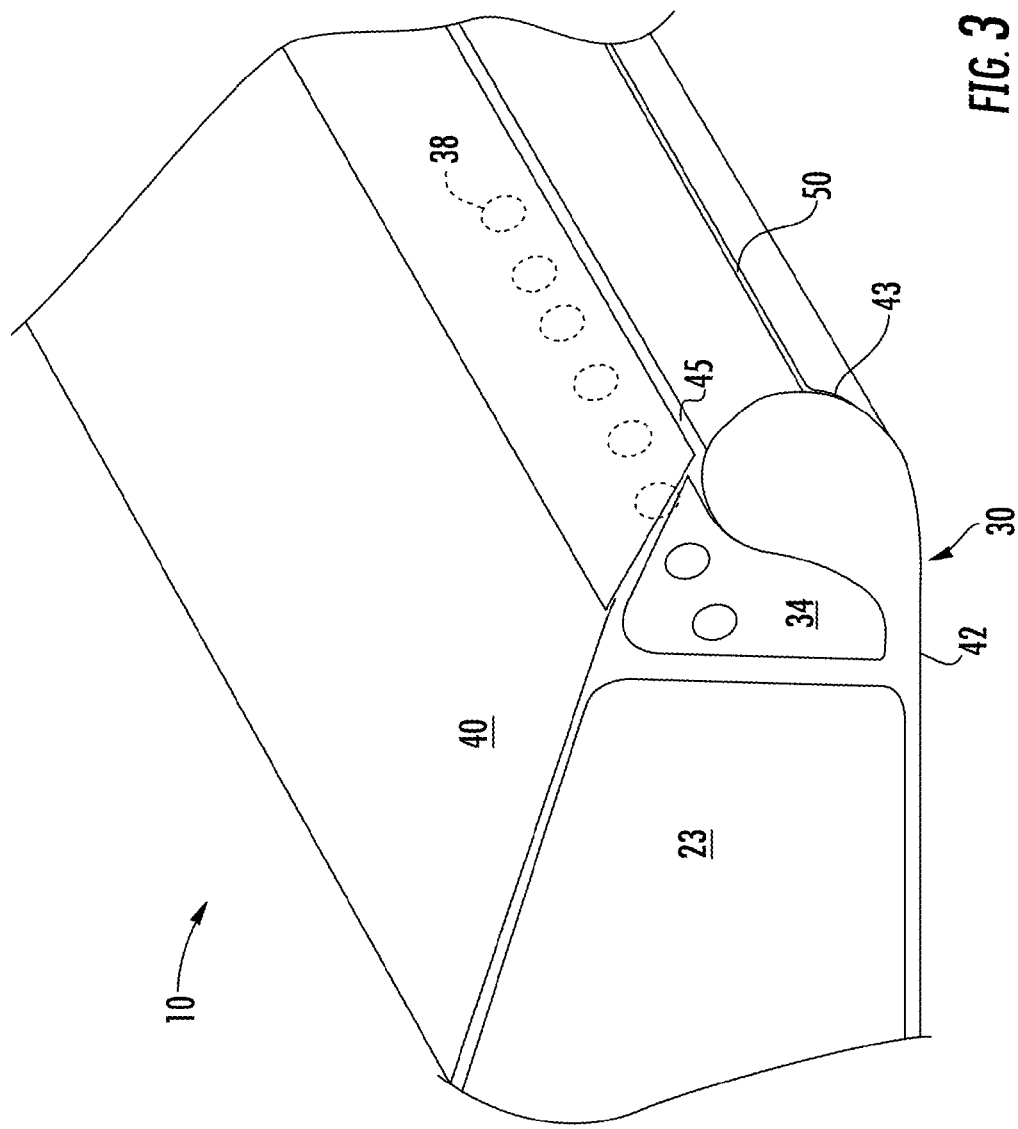
FIG. 3 is a perspective partial view of the rotor blade of FIG. 2.

Turning now to FIGS. 2 and 3, also provided is a circulation control 30, carried at a trailing edge 32 of each rotor blade 22. Circulation control 30 produces a jet of air 33 along trailing edge 32. A portion of the air/gas traveling within main duct 23 is diverted to circulation control 30 to produce jet of air 33 along trailing edge 32. Circulation control 30 includes a trailing edge duct 34 in fluid communication with main duct 23 of blade 22. In the preferred embodiment main duct 23 is separated from trailing edge duct 34 by a partition 36 that has orifices 38 of known coefficient of discharge. Trailing edge duct 34 is formed between an upper surface 40 and a lower surface 42 terminating at trailing edge 32 in a highly curved Coanda surface 43, having a radius of curvature R. Upper surface 40 terminates in a lip edge 44 of thickness T. Lip edge 44 and Coanda surface 43 are spaced apart to form a slot 45 having a height H running the length of blade 22. In the preferred embodiment the lip edge is relatively sharp, and the thickness T is less than 0.4 times the slot height H to avoid a wake region downstream of the lip that disturbs the flow of air over Coanda surface 43.

In operation, as rotor blade 22 passes through ambient air, a free air stream 58 travels along upper surface 40. As free air stream 58 reaches slot 45, it is entrained by air jet 33 and follows the curvature of Coanda surface 43 until air jet 33 and entrained free air stream 58 separate at separation point S. The separation point is typically at an angle between 120-125° from slot 45. This range of separation locations can be problematic, and will be addressed presently.

Jet 33 is blown from slot 45 over a highly curved aerodynamic surface (Coanda surface 43) to increase or modify the aerodynamic forces and moment with few or no moving surfaces. In general, the driving parameter of Circulation Control is the jet momentum coefficient, Cmu: which is defined as the mass flow of the jet ($m_{jet}$) times the velocity of the jet ($V_{jet}$) divided by the dynamic pressure (q) and the area of the airfoil (S). The value of jet momentum coefficient (Cmu), the direction of jet 33, and the total temperature of jet 33 are usually specified based on past experimental work. In most cases the direction of jet 33 is set normal to slot 45, and thus tangential to Coanda surface 43. For a typical reaction drive rotor blade chord length of 8 inches the standard slot height is about 0.2% of the chord or 0.015-inch. The slot is typically located at x/c=88.75% on the upper side of the airfoil. Most of the studies involve sea level standard day conditions with free stream velocities between 65 and 105 miles per hour. It can be shown that the coefficient of lift (Cl) is nearly constant over this wide range of speeds and it is generally concluded that the lift is independent of free air stream 58 velocities so long as Cmu is held constant. At very low momentum coefficients, the tangential blowing of jet 33 will add energy to the slow moving flow near the surface. This will delay or eliminate the separation, and is called Boundary Layer Control. When the momentum coefficient is high, the lift of the blade will be significantly increased. This is called Circulation Control (CC). The lift augmentation, which is defined as ΔCL/ΔCmu, can exceed 80. In the preferred embodiment of the present invention, the thickness T of lip edge 44 at the flow exit point is relatively critical and thickness T of lip edge 44 at trailing edge 32 will not exceed 1.4 times the slot height. If the ratio is larger, then a wake region may form downstream of the lip.

In many instances the power of rotor 20 is desired to be greater than the power available when circulation control system 30 and nozzles 28 employ the same pressure expansion ratio. To increase rotor power, rotor blade tip nozzles 28 need to have a higher pressure ratio than the circulation control jet 33. The pressure of air/gas supplied to circulation control 30 is generally limited to pressure ratios less than 2.5 atm. To properly increase power to blades 22, nozzles 28 are designed as supersonic nozzles that can stably produce very high velocities typically using pressures greater than 3 atm. This type of operation provides high take-off and hover power levels. The pressure to Coanda jet 33 would ideally be reduced to a level around 2 atm. This latter pressure avoids bifurcated shock waves forming in Coanda jet 33 leaving slot 45, which is not designed as a supersonic nozzle. At the high isoentropic velocities produce by expanding from high pressures the jet velocities can undergo local supersonic to subsonic velocity changes through local shock structures that negatively impact the attachment of jet 33 to Coanda surface 43. Besides loss of performance this can also create significant noise levels which need to be addressed.

Thus, the high pressure air/gas stream entering main duct 23 from hub 19 must be separated into two streams, one a high pressure stream (>3 atm) of high mass flow and the other a low pressure stream (<2.5 atm) of low mass flow, before they are allowed to expand to atmosphere through two separate nozzle systems. The high pressure stream provides rotor power to reaction drive helicopter 10 through its expansion to supersonic velocities through nozzles 28 at tips 26 of blades 22. The low pressure stream (should be less than 2.2-atm) is to create lift through the use of circulation control provided by Coanda surface 43. Coanda surfaces 43 do not work well with the supersonic velocities that would be created if the high pressure main stream was used. Thus, a lower pressure air stream for circulation control must be created from the high pressure stream exiting the hub.

The approach to separating the flows in the present embodiment is to use a series of orifices 38 located in partition 36 separating main duct 23 carrying the high pressure flow, with edge duct 34. Partition 36 can be a plate or sheet in the form of perforated sheet stock. This plate or sheet runs from proximal end 24 to distal end 25. A non-dimensional pressure loss parameter (ΔPc/P) can be defined in terms of the total effective open hole area ($A_{eff}$) and the desired Coanda mass flow (Wc) for a given main stream pressure (P) and temperature (T) shown as Equation 1 (Imperial units). The actual pressure loss over the plate (ΔPc) is typically non-dimensionalized for ease of use.

$$\Delta Pc/P = (0.829) * (Wc * T^{0.5}/A_{eff} * P)^2 \qquad \text{Equation 1}$$

The effective open hole area is equal to the geometric open hole area multiplied by a "discharge coefficient" (Cd). The value of Cd is a function of the hole diameter (d) based Reynolds Number (Red), the pitch to diameter ratio (P/d) of the holes and the ratio of plate thickness to the hole diameter (T/d). Correlations for the discharge coefficient (Cd) are available from a number of investigators for triangular hole pitches. These are typically provide as a function of K which in turn is a function of the ratio of the hole diameter to the hole pitch (d/P). The empirical equation that best describes the relationship between Cd and K is provided here as Equation 2.

$$Cd = K(d/P)0.10 \qquad \text{Equation 2}$$

For design purposes (T/d) is taken to be greater than 1.6 which is usually required to provide the necessary strength to withstand the pressure drop over the holes. If it is also assumed that the flow involved is fully turbulent (Red greater than 20,000) then K is approximately constant at 0.965 for T/d>1.6. With these design assumptions the discharge coefficient can be determined with high accuracy well below the effects of hole eccentricity or other manufacturing flaws.

Figure 4:
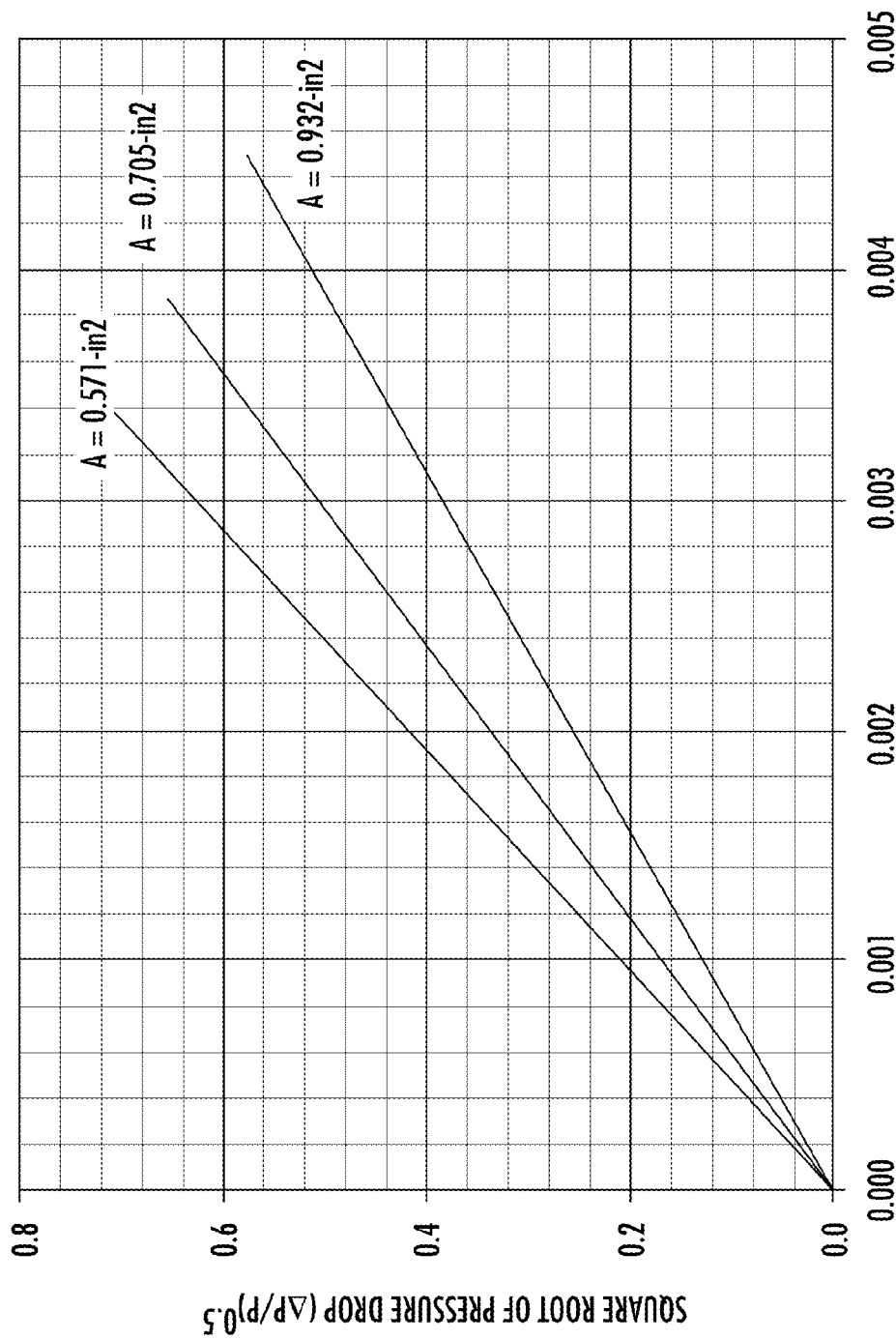
FIG. 4 is a graph that can be used to find the required area for a desired pressure drop and mass flow.

Turning briefly to FIG. 4, a graph provides the relationships of Equation 1 in graphical form and is loosely based on past inlet pressures and temperatures together with estimates of the Coanda mass flow for a small reaction drive (2-seat) helicopter. The graph can be used to find the required area for a desired pressure drop and mass flow. For a hole diameter of around 0.1-inch the required number of hole is on the order of thousands. More typically because the blade spans can be around 9-ft even for small reaction drive helicopters, the hole diameters will probably be closer to 0.05-inch. For higher mass flows (larger helicopters) the holes will be larger in diameter for a given pressure drop. The characteristics shown in FIG. 3 relate to perforated sheet/plate stock where the holes are arranged on a triangular pitch basis.

In addition to the above circulation control system 30, a trip-strip 50 has been added to Coanda surface 43. The flow over the surface typically separates at an angle between 120 to 125-degrees from slot 45. This separation can become periodic in nature with the separation point moving between the two angles. This separation "flipping" may cause vibration and periodic lift forces. To reduce or avoid this unsteady flow phenomenon, a trip-strip 50 consisting of a length of wire is attached to the surface at or about the 120-degree point to force the separation to consistently take place at this specific point. The shape of the wire depicted is generally circular in section but can be almost any shape. The height of the trip strip will be derived for each specific application as height depends on and varies with the Coanda surface shape and surface finish.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A rotor blade for a reaction drive type helicopter, the rotor blade comprising:
   a proximal end couplable to a rotor hub, a distal end terminating in a blade tip, and a trailing edge extending from the proximal end to the distal end;
   a main duct extending from the proximal end, for fluid communication with the rotor hub, to the distal end, the main duct for ducting a first air/gas stream from the rotor hub to the blade tip;
   a nozzle attached to an outlet of the main duct at the blade tip for receiving the first air/gas stream from the main duct and releasing the first air/gas stream to propel the rotor blade;
   a circulation control carried at the trailing edge;
   a trailing edge duct carried intermediate the trailing edge and the main duct, the trailing edge duct separated from the main duct by a partition;
   a plurality of orifices formed in the partition to bleed air from the main duct and generate a second air/gas stream therein with a pressure less than the pressure of the first air/gas stream;
   the circulation control including an upper surface of the blade terminating in a lip edge at the trailing edge, a lower surface terminating in a Coanda surface at the trailing edge, and a slot defined between the Coanda surface and the lip edge at the trailing edge in fluid communication with the trailing edge duct for receiving the second air/gas stream from the trailing edge duct and releasing the second air/gas stream to produce a Coanda effect; and
   a trip-strip attached to the Coanda surface at approximately the 120-degree point to force a separation of the Coanda effect from the Coanda surface.

2. A rotor blade for a reaction drive type helicopter as claimed in claim 1 wherein the pressure of the first air/gas stream is >3.0 atm and the pressure of the second air/gas stream is <2.5 atm.

3. A rotor blade for a reaction drive type helicopter as claimed in claim 1 wherein the slot height is approximately 0.2% of a chord length of the rotor blade.

4. A rotor blade for a reaction drive type helicopter as claimed in claim 3 wherein the lip edge has a thickness that is less than 0.4 times the slot height.

5. A rotor blade for a reaction drive type helicopter, the rotor blade comprising:
   a proximal end couplable to a rotor hub, a distal end terminating in a blade tip, and a trailing edge extending from the proximal end to the distal end;
   a main duct extending from the proximal end, for fluid communication with the rotor hub, to the distal end, the main duct for ducting a first air/gas stream from the rotor hub to the blade tip;
   a nozzle attached to an outlet of the main duct at the blade tip for receiving the first air/gas stream from the main duct and releasing the first air/gas stream to propel the rotor blade;
   a trailing edge duct carried intermediate the trailing edge and the main duct, the trailing edge duct separated from the main duct by a partition;
   a plurality of orifices formed in the partition to bleed air from the main duct and generate a second air/gas stream therein with a pressure less than the pressure of the first air/gas stream;
   an upper surface of the blade terminating in a lip edge at the trailing edge;

a lower surface terminating in a Coanda surface at the trailing edge;

a slot defined between the Coanda surface and the lip edge at the trailing edge in fluid communication with the trailing edge duct for receiving the second air/gas stream from the trailing edge duct and releasing the second air/gas stream to produce a Coanda effect; and a trip-strip attached to the Coanda surface at approximately the 120-degree point to force a separation of the Coanda effect from the Coanda surface.

6. A rotor blade for a reaction drive type helicopter as claimed in claim 5 wherein the pressure of the first air/gas stream is >3.0 atm and the pressure of the second air/gas stream is <2.5 atm.

7. A rotor blade for a reaction drive type helicopter as claimed in claim 5 wherein the slot height is approximately 0.2% of a chord length of the rotor blade.

8. A rotor blade for a reaction drive type helicopter as claimed in claim 7 wherein the lip edge has a thickness that is less than 0.4 times the slot height.

9. A reaction drive type helicopter comprising:

a body;

an engine carried by the body for producing a stream of compressed air/gas;

a hollow rotor mast carried by the body for receiving the stream of air/gas, the mast terminating in a rotor hub; and a plurality of blades, each blade of the plurality of blades comprising:

a proximal end coupled to the hub, a distal end, and a main duct extending from the proximal end to the distal end terminating in a blade tip, the main duct in fluid communication with the mast through the hub for ducting a first air/gas stream from the mast to the blade tip;

a nozzle attached to an outlet of the main duct at the blade tip for receiving the first air/gas stream from the main duct and releasing the first air/gas stream to propel the rotor blade;

a circulation control system carried at the trailing edge;

a trailing edge duct carried intermediate the trailing edge and the main duct, the trailing edge duct separated from the main duct by a partition;

a plurality of orifices formed in the partition to bleed air from the main duct and generate a second air/gas stream therein with a pressure less than the pressure of the first air/gas stream; and the circulation control including an upper surface of the blade terminating in a lip edge at the trailing edge, a lower surface terminating in a Coanda surface at the trailing edge, and a slot defined between the Coanda surface and the lip edge at the trailing edge in fluid communication with the trailing edge duct for receiving the second air/gas stream from the trailing edge duct and releasing the second air/gas stream to produce a Coanda effect; and a trip-strip attached to the Coanda surface at approximately the 120-degree point to force a separation of the Coanda effect from the Coanda surface.

10. A reaction drive type helicopter as claimed in claim 9 wherein the pressure of the first air/gas stream is >3.0 atm and the pressure of the second air/gas stream is <2.5 atm.

11. A reaction drive type helicopter as claimed in claim 9 wherein the slot height is approximately 0.2% of a chord length of the rotor blade.

12. A reaction drive type helicopter as claimed in claim 11 wherein the lip edge has a thickness that is less than 0.4 times the slot height.

\* \* \* \* \*